United States Patent [19]

Hughes

[11] Patent Number: 5,096,639
[45] Date of Patent: Mar. 17, 1992

[54] PROCESS FOR MANUFACTURING A PADDED ELEMENT

[75] Inventor: Ian L. Hughes, Windsor, Canada

[73] Assignee: Woodbridge Foam Corporation, Ontario, Canada

[21] Appl. No.: 562,925

[22] Filed: Aug. 6, 1990

Related U.S. Application Data

[63] Continuation-in-part of Ser. No. 500,080, Mar. 28, 1990, abandoned.

[51] Int. Cl.$^5$ .............................................. B29C 67/22
[52] U.S. Cl. .............................. 264/46.5; 264/46.4; 264/46.6; 264/257
[58] Field of Search ............... 264/45.1, 46.4, 46.5, 264/46.6, 46.8, 257

[56] References Cited

U.S. PATENT DOCUMENTS

| | | | |
|---|---|---|---|
| 3,264,382 | 8/1966 | Angell et al. | 264/338 |
| 4,544,126 | 10/1985 | Melchert | 264/255 |
| 4,593,449 | 6/1986 | Meray-Hovarth et al. | 29/527.1 |
| 4,806,302 | 2/1989 | Frank | 264/46.8 |
| 4,860,415 | 8/1989 | Witzke | 264/46.8 |
| 4,873,036 | 10/1989 | Urai | 264/46.4 |
| 4,923,539 | 5/1990 | Spengler et al. | 264/46.5 |
| 4,923,653 | 5/1990 | Matsuura et al. | 264/46.6 |
| 5,000,805 | 3/1991 | Lowe | 264/46.8 |

FOREIGN PATENT DOCUMENTS

| | | |
|---|---|---|
| 0242152 | 10/1987 | European Pat. Off. . |
| 3525417A1 | 1/1987 | Fed. Rep. of Germany . |
| 8114763 | 7/1984 | France . |
| 2634157 | 1/1990 | France . |
| 47-042623 | 10/1972 | Japan .................. 264/46.4 |
| 59-034291 | 12/1984 | Japan .................. 264/46.4 |
| 1-238910 | 9/1989 | Japan .................. 264/46.4 |
| 1-299009 | 12/1989 | Japan .................. 264/46.4 |
| 2114051A | 8/1983 | United Kingdom . |

*Primary Examiner*—Robert A. Dawson
*Assistant Examiner*—Allan R. Kuhns
*Attorney, Agent, or Firm*—Nixon & Vanderhye

[57] ABSTRACT

A process for manufacturing a padded element using a mold having an upper mold and a lower mold. The process includes placing a cushion member on the lower mold. The upper surface of the cushion member includes a first portion having an open recess with a boundary extending therearound for containing a liquid foamable polymeric composition in the recess. A trim cover with a finished upper surface is placed in contact with the interior surface of the upper mold. A liquid foamable polymeric composition is dispensed in the open recess within the boundary, and the upper mold and the lower mold are closed to cover the open recess and form an enclosure containing the liquid foamable polymeric composition. The polymeric composition expands to fill substantially the enclosure and adheres to the cushion member and to the inner surface of the trim cover.

17 Claims, 5 Drawing Sheets

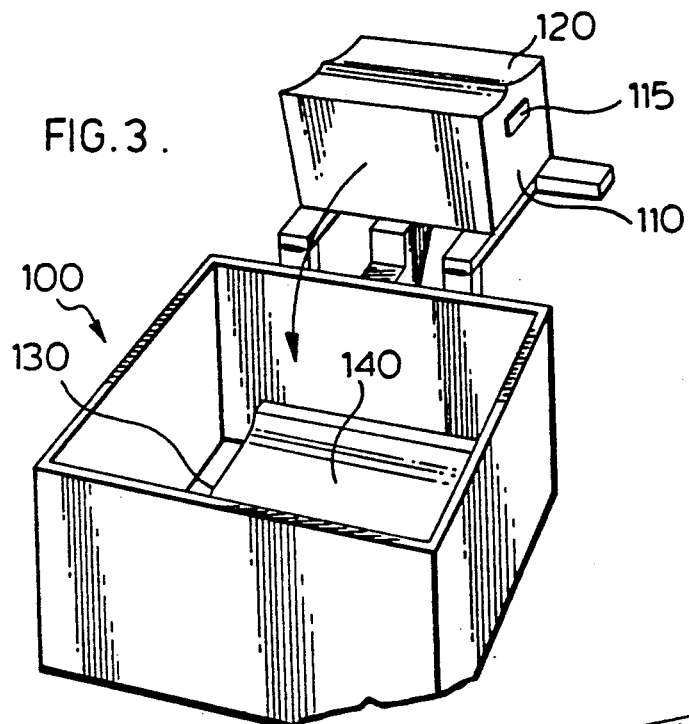
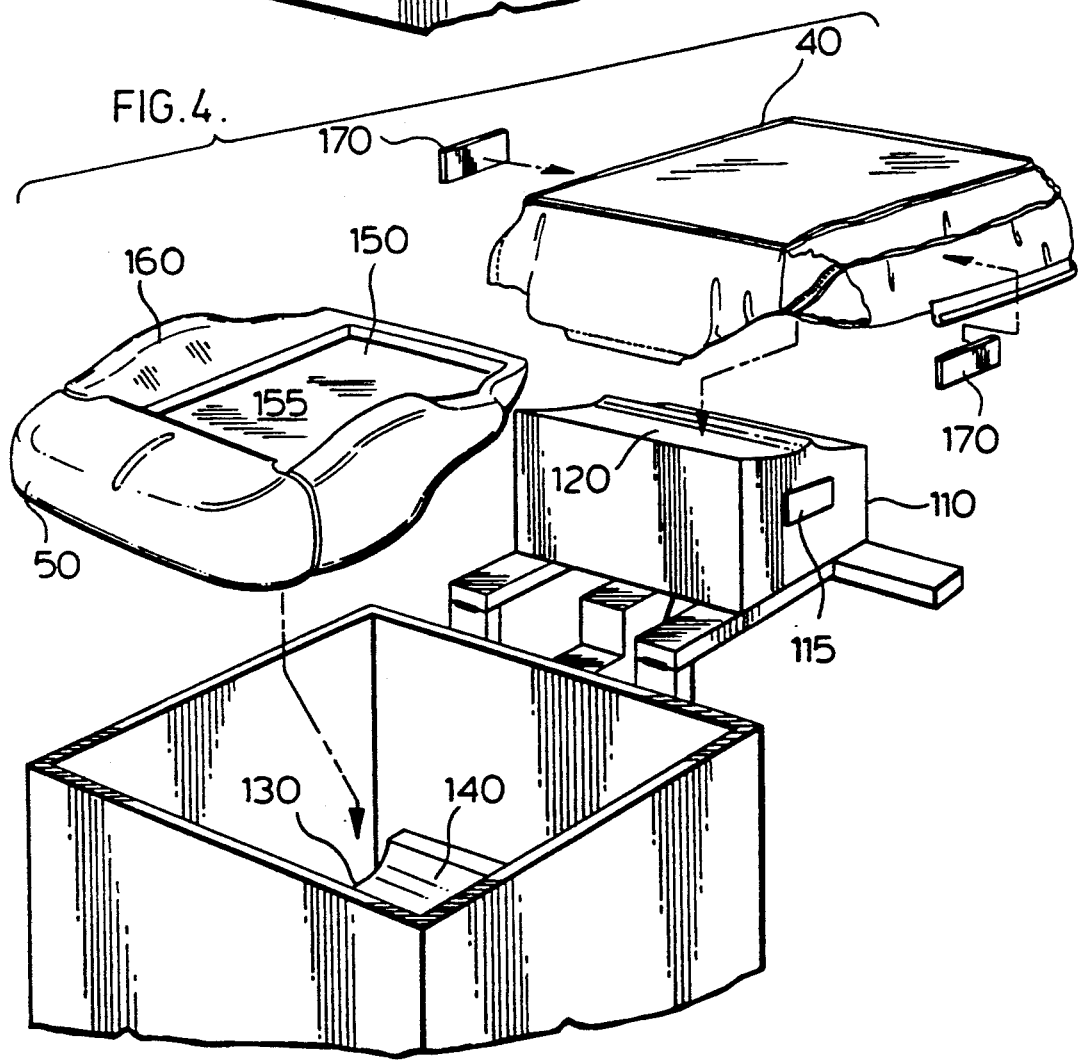

PROCESS FOR MANUFACTURING A PADDED ELEMENT

CROSS-REFERENCE TO RELATED APPLICATION

This application is a continuation-in-part of application Ser. No. 07/500,080, filed Mar. 28, 1990, now abandoned.

FIELD OF THE INVENTION

The present invention relates to a process for manufacturing a padded element. More particularly, the present invention relates to a process for manufacturing a unit-type padded element including a trim cover and a cushion member formed as a unit.

DESCRIPTION OF THE PRIOR ART

Heretofore, the methods of assembling and joining a decorative cover to the underlying padding material typically fell within one of the following techniques: mechanically retained assembly, adhesive bonded assembly and foam-in-place (also known as molded-in-place) assembly. Such assemblies have found use as, for example, vehicle seats.

In the mechanically retained assembly, the seat cover is cut and sewn to shape, and thereafter joined to the padding material by means of metal "hog rings" or "C" clips which join molded in wires in the seat pad to sewn-in-wires in the trim cover. Alternatively, the securing means could be "hook and loop" devices (commercially available under the trade name Velcro) wherein the "hook" is molded into the seat pad and the "loop" is either sewn in or laminated on to the seat cover material. Unfortunately, this mechanically retained assembly is deficient. For example, the method of manufacturing this assembly is relatively complicated in that auxiliary wires or "hooks" must be molded into the seat pad. Further, auxiliary wire pockets or loop sheeting must be sewn in or laminated on to the seat cover material. Still further, the cost of these mechanical auxiliary means is onerous when compared to the cost of the foam padding material and the seat cover material. This results in a seat which is produced in a relatively complicated manner and at a relatively high expense.

In the adhesive bonded assembly, a molded foam seat pad with the desired style and surface contours is located in a die or fixture. An adhesive in the form of a liquid, powder or film is applied to the surface of the pad. The seat cover material is held in a separate fixture and formed to the finished shape using one or more of vacuum (pressure), heat set, and steam. The seat cover material with the die fixture is then registered to the pad. Thereafter, application of heat, steam and pressure activates the adhesive and joins the seat pad to the seat cover material. This assembly is deficient in that the method of manufacturing it requires the use of external heat, steam, vacuum and relatively high pressure. Further, this assembly sometimes requires the use of a relatively expensive and toxic adhesive to bond the seat pad to the seat cover material.

In the foamed-in-place assembly, the seat cover material is located in a tool and held in place with mechanical devices and/or with application of a vacuum. An impervious barrier is applied to the underside of the cover to permit the vacuum to serve its intended function. Thereafter, liquid polyurethane foam is poured into the seat cover. A sealed lid closes the mold and remains closed until the foam is set in the desired shape. As the foam expands and fills the mold, it adheres directly to the impervious barrier. This assembly is deficient in that it requires the use of external pressure and vacuum. The assembly also requires the use of an impervious backing to vacuum form the seat cover material. The backing also results in prevention "breathing" of the finished system; this is undesirable.

In addition to the above-identified deficiencies of the prior art assemblies, extreme care must be taken when working with vinyl and with relatively exotic seat cover materials such as leather. For example, application of heat and steam to leather during the manufacturing of the assembly can permanently denature the leather thereby altering its texture and/or appearance. Further, the application of heat and steam can alter the gloss level of vinyl and also tends to wash out the grain surface.

It would be desirable to have a simple process for the manufacture of a padded element, which process could be used with virtually all conventional cover materials and which could be used to manufacture padded elements in a relatively efficient manner.

SUMMARY OF THE INVENTION

It is an object of the present invention to provide a novel process for the production of a padded element.

It is another object of the invention to provide a novel process for manufacturing a padded element using any of the conventional cover materials without damage thereof during the process.

It is yet another object of the invention to provide a novel process for manufacturing a padded element which does not require the use of external heat, steam, vacuum or relatively high pressure.

Accordingly, the present invention provides a process for manufacturing a padded element using a mold including an upper mold having an interior surface corresponding substantially to the upper surface of the padded element and a lower mold having an interior surface corresponding substantially to the lower surface of the padded element, the process comprising the steps of:

(i) placing a cushion member on the lower mold, the upper surface of the cushion member comprising a first portion having a cavity therein;

(ii) placing a trim cover on the upper mold, the trim cover comprising a finished outer surface in contact with the interior surface of the upper mold and an inner surface;

(iii) placing a liquid foamable polymeric composition in the cavity;

(iv) closing the upper mold and the lower mold to enclose thereby the cavity;

whereby, the polymeric composition expands to fill substantially the cavity, and adheres to the first portion of the cushion member and to the inner surface of the trim cover.

As used throughout the present specification, the term "cavity", when used with reference to the first portion of a cushion member, is intended to mean that the cushion member surface to be adhered to the trim cover is undersized when compared to the padded element to be formed. For example, the first portion of the cushion member, which comprises the cavity, may form a portion of the surface to be adhered to the trim cover (as illustrated hereinafter)—in this embodiment, the cushion member would also include a second portion corresponding proportionally to the finished surface of the padded element to be formed. Alternatively, the first portion of the cushion member, may form the entire surface to be adhered to the trim cover (e.g. an entire surface of the cushion member).

Thus, the present process may be used to produce padded elements without the requirement of using heat, pressure and steam.

In a preferred aspect of the process, the inner surface of the trim cover comprises a layer of material capable of enhancing adhesion between the trim cover and the polymeric composition after expansion. Examples of suitable such materials include a foam layer, a reticulated fabric layer and the like. Preferably, the material is a foam layer. For certain trim covers (e.g. those made of cloth), it is not necessary to have a separate layer of material.

BRIEF DESCRIPTION OF THE DRAWINGS

Embodiments of the present invention will be described with reference to the accompanying drawings in which:

FIG. 3 is a perspective view of a mold suitable for conducting the present process;

FIG. 4 is a perspective view of the mold wherein the initial steps of the present process are conducted;

DESCRIPTION OF THE PREFERRED EMBODIMENTS

Preferred embodiments of the invention will now be described with reference to FIGS. 1-7. In the Figures, like numerals designate like parts.

Figure 1:
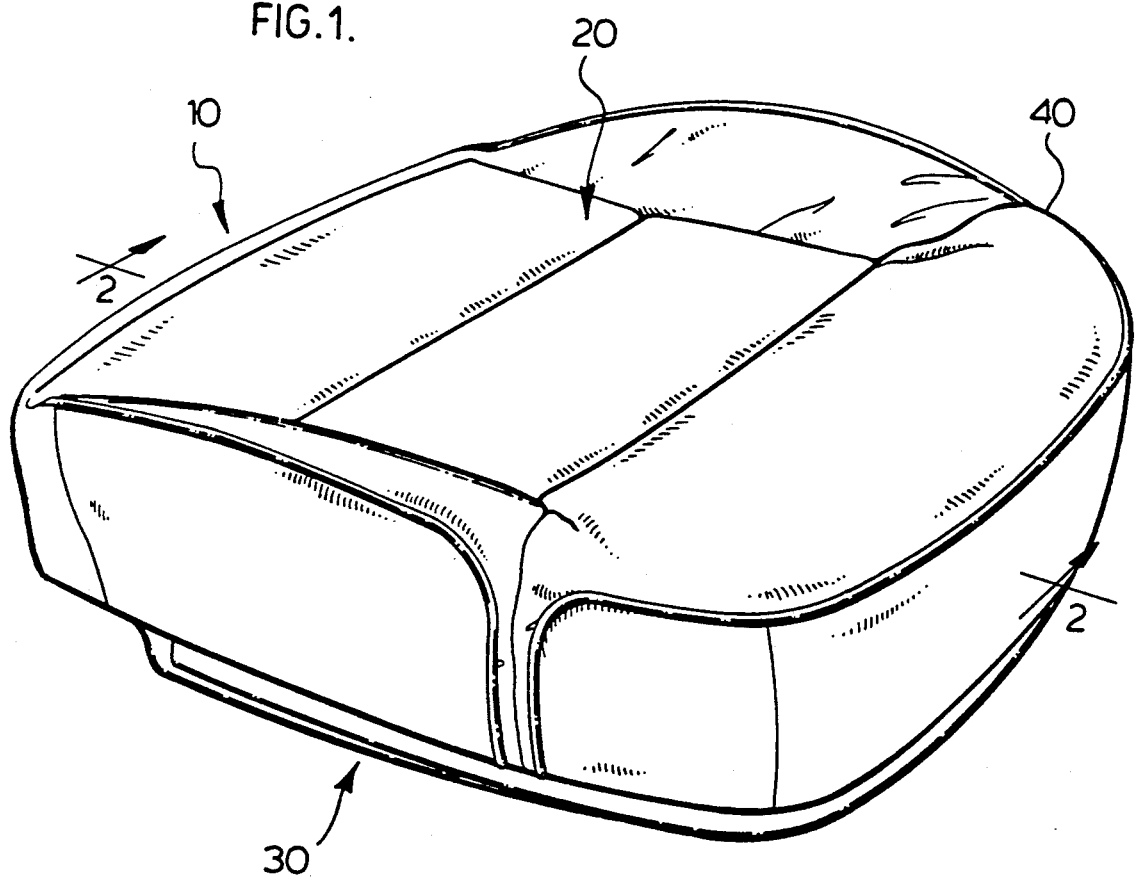
FIG. 1 is a perspective view of a padded element produced in accordance with the present process.
Figure 2:
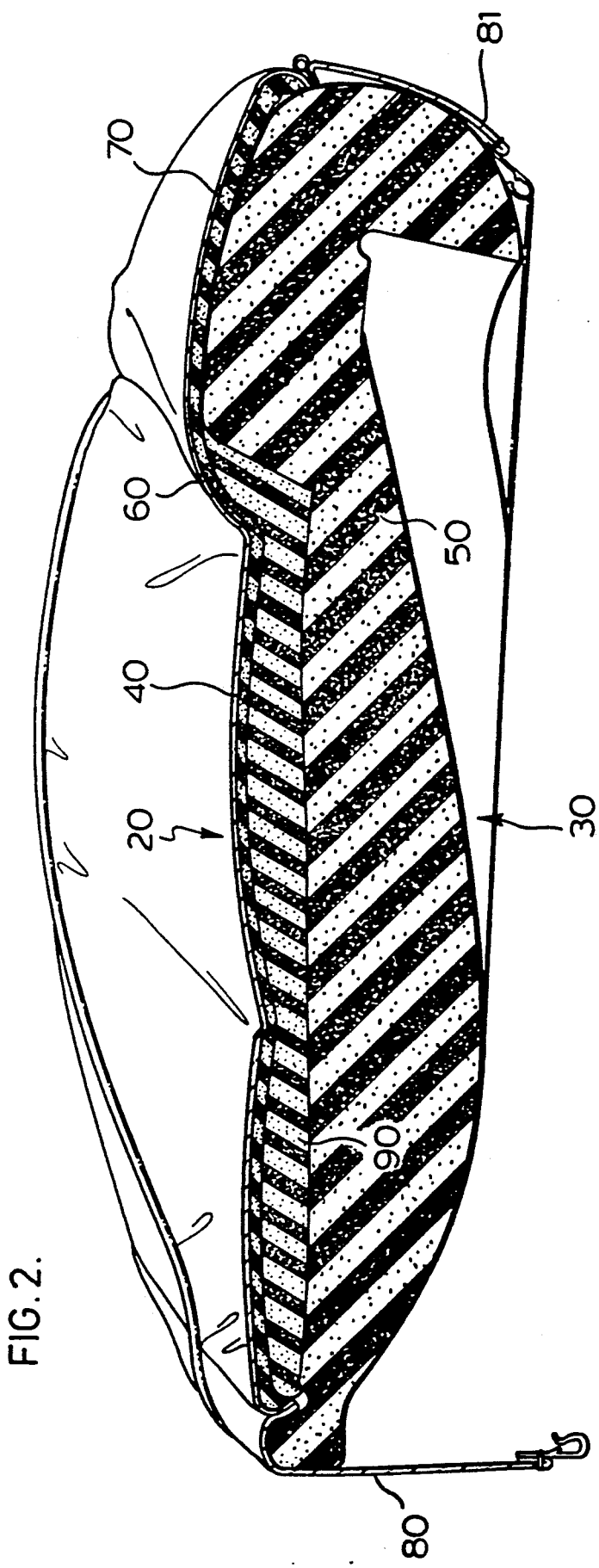
FIG. 2 is a section along the line 2—2 in FIG. 1.

With reference to FIGS. 1 and 2, there is illustrated a padded element in the form of vehicle seat 10 produced in accordance with the present process. Vehicle seat 10 comprises an upper surface 20 and a lower surface 30. Vehicle seat 10 further comprises a trim cover 40 and a cushion member 50. Trim cover 40 includes a finished outer surface 60, an inner surface comprising foam layer 70 and side panels 80. Adhering trim cover 40 to cushion member 50 is a foam member 90. The production of foam member 90 will be described in more detail hereinafter.

With reference to FIG. 3, there is illustrated a mold 100 suitable for use in the present process. Mold 100 comprises an upper mold 110 having an interior surface 120 corresponding substantially to upper surface 20 of vehicle seat 10. Mold 100 further comprises a lower mold 130 having an interior surface 140 corresponding substantially to lower surface 30 of vehicle seat 10. Upper mold 110 further comprises steel bars 115 (only one is illustrated) oppositely disposed from one another.

With reference to FIG. 4, cushion member 50 is placed on interior surface 140 of lower mold 130. Cushion member 50 comprises a first portion 150 having a cavity 155 therein and a second portion 160 corresponding proportionally to upper surface 20 of vehicle seat 10. By "proportionally" it is meant that, with the exception of first portion 150, the upper surface of cushion member 50 corresponds to upper surface 20 of vehicle seat 10 (i.e. the seat to be formed).

Trim cover 40 is placed on interior surface 120 of upper mold 110 such that finished upper surface 60 is in contact with interior surface 120. Trim cover 40 is held in place on upper mold 110 by any suitable means. In the embodiment illustrated in FIG. 4, trim cover 40 may be held in place by magnetic bars 170 which attract steel bars 115 on upper mold 110 and serve to affix side panels 80 of the trim cover.

Figure 5:
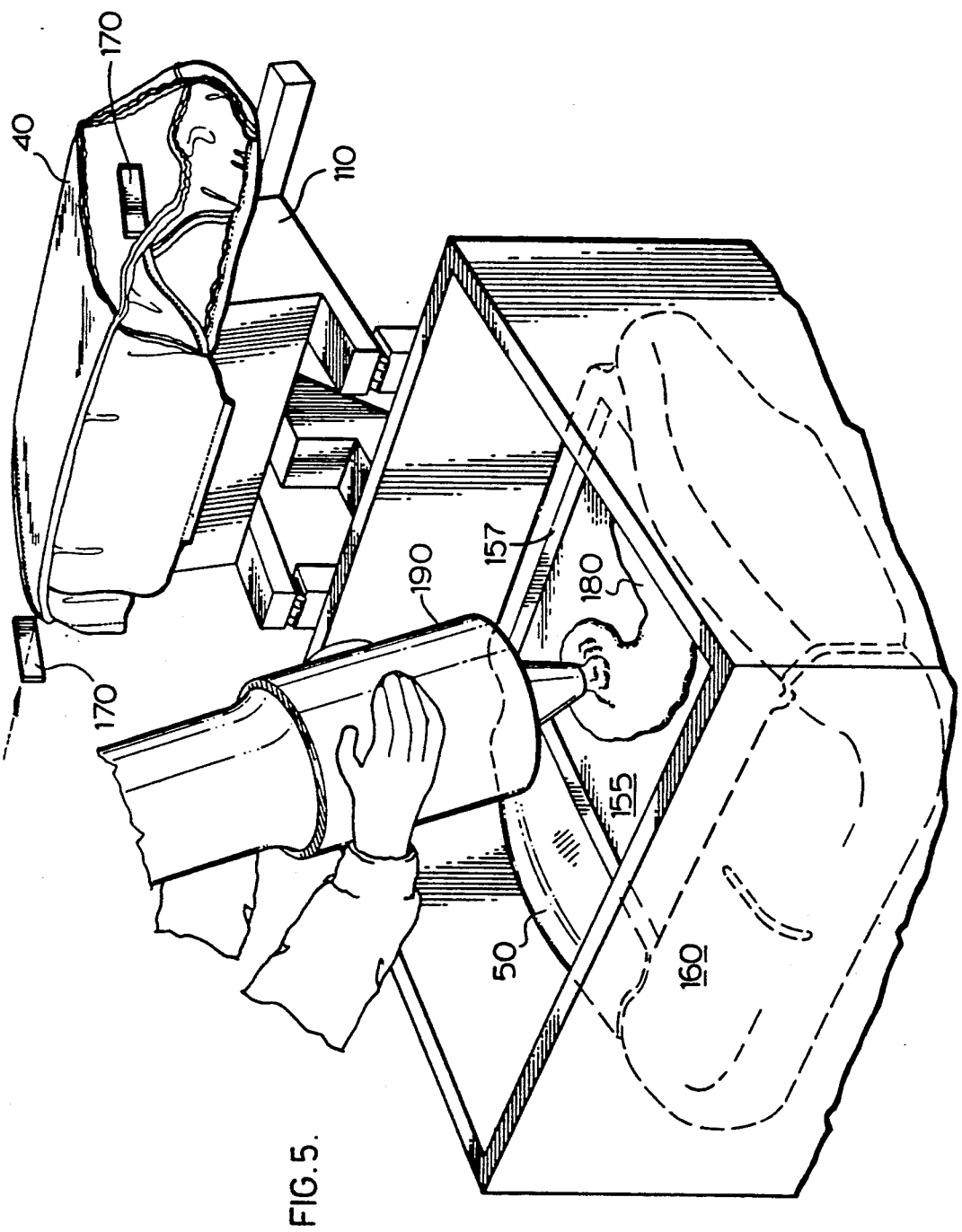
FIG. 5 is a perspective view of the mold comprising the trim cover on the upper mold, the cushion member on the lower mold and the foamable polymeric composition in the cavity of the cushion member.
Figure 6:
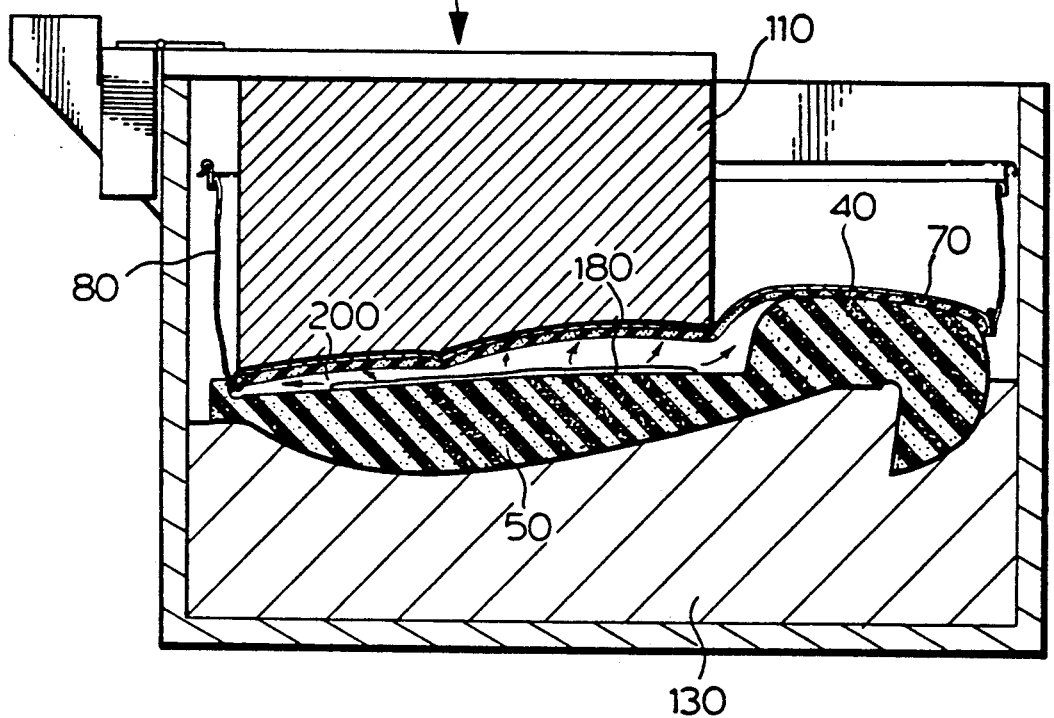
FIG. 6 is a sectional view of the closed mold.
Figure 7:
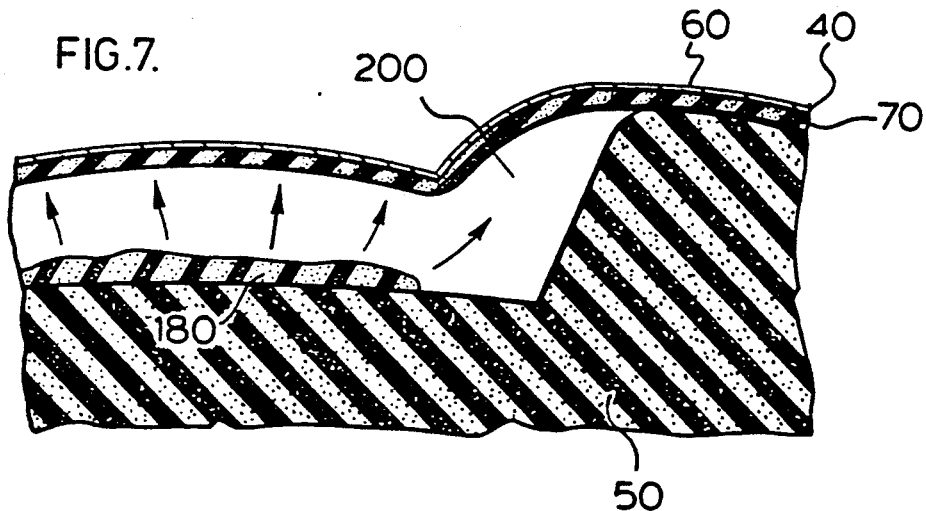
FIG. 7 is an enlargement of a portion of FIG. 6.

With reference to FIG. 5, a liquid foamable polymeric composition 180 is dispensed from container 190 to cavity 155 in cushion member 50. The cavity 155 has a boundary 157 extending therearound for containing the liquid foamable polymeric composition 180. The form of liquid foamable polymeric composition suitable for use in the present process and the manner by which it is dispensed into the cavity is not particularly restricted. Preferably, the foamable polymeric composition comprises a polyurethane. More preferably the polyurethane is a diphenylmethane diisocyanate (MDI)-based system of low index and of a high molecular weight conventional polyol. Such a system is typically completely "water blown" using highly-catalyzed odorless amines and a cell regulator. Typically, this system cures at room temperature in about three minutes or less.

After foamable polymeric composition 180 is dispensed in cavity 155, mold 100 is closed (FIG. 6) to abut second portion 160 and trim cover 40 thereby enclosing cavity 155 to define enclosure 200. Thereafter, foamable composition 180 expands to fill substantially enclosure 200. This expansion results in the formation of foam member 90 (FIG. 2). Depending on the type of foamable polymeric composition used, such expansion can occur within 30 seconds to three minutes after dispensing in the cavity of the cushion member. Thus, foam member 90 adheres to first portion 150 of cushion member 50 and to a portion of foam layer 70 of trim cover 40. After the suitable period of time has elapsed for expansion of the foamable polymeric composition, the vehicle seat may be removed from the mold. Thereafter, side panels 80 of trim cover 40 may be pulled down over the sides of cushion member 50. The resultant vehicle seat is illustrated in FIGS. 1 and 2.

The present process can be used manufacture a variety of padded elements. Non-limiting examples such padded elements include: components of vehicle seats such as the seat cushion, the backrest and the headrest; components of other types of seat systems such as those used in boats, snowmobiles, and in office furniture; pillar covers; and padded interior door and quarter trim panels in vehicles.

Further, the present process can be used with virtually all conventional trim cover materials. Non-limiting examples of such materials include leather, vinyl and cloth. Preferably, the inner surface of the trim cover includes a foam layer made of polyurethane foam.

The present process can be used with virtually any cushion member which is made from a resilient material. The preferred foam cushion member is made from a polymer foam, more preferably polyurethane foam. Alternatively, the cushion member may be made from horsehair or coconut fibers which are resin-filled, or from cotton or jute.

In the most preferred embodiment of the present process, each of the foam layer (when present) of the inner surface of the trim cover, the cushion member and the foamable polymeric composition comprises polyurethane.

Thus, the present process can be used to produce a padded element in a convenient and efficient manner. There is no requirement to use high temperature, pressure, vacuum or steam during the present process as there is with the prior art processes discussed hereinabove.

What is claimed is:

1. A process for manufacturing a padded element using a mold including an upper mold having an interior surface corresponding substantially to an upper surface of the padded element and a lower mold having an interior surface corresponding substantially to a lower surface of the padded element, the process comprising the steps of:
   (i) placing a cushion member having an upper surface on said lower mold, the upper surface of said cushion member comprising a first portion having an open recess therein, said open recess having a boundary extending therearound for containing a liquid foamable polymeric composition in said open recess;
   (ii) placing a trim cover on said upper mold, said trim cover comprising an inner surface and a finished outer surface in contact with the interior surface of said upper mold;
   (iii) dispensing a liquid foamable polymeric composition in said open recess within said boundary; and
   (iv) closing said upper mold and said lower mold to cover said open recess and form an enclosure containing said liquid foamable polymeric composition, said polymeric composition expanding to fill substantially said enclosure and adhering to said cushion member and to the inner surface of said trim cover.

2. The process defined in claim 1, wherein said cushion member further comprises a second portion corresponding proportionally to the finished surface of the padded element.

3. The process defined in claim 1, wherein the inner surface of the trim cover comprises a layer of material capable of enhancing adhesion between the trim cover and the polymeric composition.

4. The process defined in claim 3, wherein said material is a foam layer.

5. The process defined in claim 3, wherein said material is a reticulated fabric.

6. The process defined in claim 1, wherein the finished upper surface of said trim cover is made of leather.

7. The process defined in claim 1, wherein the finished upper surface of said trim cover is made of vinyl.

8. The process defined in claim 1, wherein the finished upper surface of said trim cover is made of cloth.

9. The process defined in claim 4, wherein the foam layer comprises a polyurethane foam.

10. The process defined in claim 1, wherein said cushion member comprises a polyurethane foam.

11. The process defined in claim 1, wherein said foamable polymeric composition comprises polyurethane 12. The process defined in claim 4, wherein each of the foam layer, said cushion member and said foamable polymeric composition comprises polyurethane.

13. The process defined in claim 12, wherein the padded element is a component of a vehicle seat.

14. The process defined in claim 13, wherein said component is a seat cushion.

15. The process defined in claim 13, wherein said component is a backrest.

16. The process defined in claim 1, wherein the padded element is a component of a seat system.

17. A process for manufacturing a padded element of a seat system using a mold including an upper mold having an interior surface corresponding substantially to an upper surface of the padded element and a lower mold having an interior surface corresponding substantially to a lower surface of the padded element, the process comprising the steps of:
   (i) placing a polyurethane cushion member having an upper surface on said lower mold, the upper surface of said cushion member comprising a first portion having an open recess therein and a second portion corresponding proportionally to the upper surface of the padded element, said open recess having a boundary extending therearound for containing a liquid foamable polyurethane composition in said open recess;
   (ii) placing a trim cover on said upper mold, said trim cover comprising a finished outer surface in contact with the interior surface of said upper mold and an inner surface comprising a polyurethane foam layer;;
   (iii) dispensing a liquid foamable polyurethane composition in said open recess within said boundary; and
   (iv) closing said upper mold and said lower mold to cover said recess and form an enclosure containing said liquid foamable polyurethane composition, said polyurethane composition expanding to fill substantially said enclosure, and adhering to said cushion member and to the foam layer of said trim cover.

* * * * *